(12) United States Patent
Zhang

(10) Patent No.: US 10,960,406 B2
(45) Date of Patent: Mar. 30, 2021

(54) AIR PURIFIER

(71) Applicant: BOE TECHNOLOGY GROUP CO., LTD., Beijing (CN)

(72) Inventor: Jingyu Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 377 days.

(21) Appl. No.: 15/987,095

(22) Filed: May 23, 2018

(65) Prior Publication Data
US 2019/0083990 A1 Mar. 21, 2019

(30) Foreign Application Priority Data

Sep. 19, 2017 (CN) .......................... 201721206334.X

(51) Int. Cl.
| | |
|---|---|
| B03C 3/16 | (2006.01) |
| B03C 3/011 | (2006.01) |
| B01D 46/00 | (2006.01) |
| B01D 53/04 | (2006.01) |
| B01D 50/00 | (2006.01) |
| B01D 46/10 | (2006.01) |
| B01D 53/46 | (2006.01) |
| B03C 3/36 | (2006.01) |
| B03C 3/53 | (2006.01) |
| B01D 47/06 | (2006.01) |

(52) U.S. Cl.
CPC ............ *B03C 3/16* (2013.01); *B01D 46/0032* (2013.01); *B01D 46/0035* (2013.01); *B01D 46/0036* (2013.01); *B01D 46/10* (2013.01); *B01D 50/006* (2013.01); *B01D 53/04* (2013.01); *B01D 53/46* (2013.01); *B03C 3/011* (2013.01); *B03C 3/368* (2013.01); *B03C 3/53* (2013.01); *B01D 47/06* (2013.01); *B01D 2252/103* (2013.01); *B01D 2253/102* (2013.01); *B01D 2257/90* (2013.01); *B01D 2258/06* (2013.01); *B01D 2273/30* (2013.01); *B01D 2275/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,509,946 A | * | 4/1996 | Chu ...................... | B01D 47/06 55/322 |
| 7,448,224 B2 | * | 11/2008 | Wu ...................... | B01D 53/265 62/77 |
| 7,993,589 B1 | * | 8/2011 | Shigemoto ............ | B01D 46/30 422/122 |

(Continued)

FOREIGN PATENT DOCUMENTS

| | | |
|---|---|---|
| CN | 1958095 A | 5/2007 |
| CN | 02607127 | * 7/2012 |
| JP | 6000039 B2 | * 9/2016 |

*Primary Examiner* — Christopher P Jones
*Assistant Examiner* — Sonji Turner
(74) *Attorney, Agent, or Firm* — Calfee, Halter & Griswold LLP

(57) ABSTRACT

An air purifier is provided, including a box body and a filter screen inside the box body, an air suction device, a water mist generator, the water mist generator being disposed at one side of the filter screen, the air suction device being configured to inhale outdoor air into an interior of the box body, and the water mist generator being configured to form an ionized water layer.

19 Claims, 2 Drawing Sheets

(56) References Cited

U.S. PATENT DOCUMENTS

| | | | |
|---|---|---|---|
| 2004/0130271 A1* | 7/2004 | Sekoguchi | H01T 23/00 315/111.81 |
| 2008/0128272 A1* | 6/2008 | Sonoda | A61L 9/16 204/278 |
| 2009/0314164 A1* | 12/2009 | Yamashita | F24F 3/1603 96/245 |
| 2011/0067571 A1* | 3/2011 | Asano | B01D 46/50 96/27 |
| 2015/0266032 A1* | 9/2015 | Zhou | B03C 3/41 96/53 |

* cited by examiner

AIR PURIFIER

CROSS REFERENCE

This application is based upon and claims priority to Chinese Patent Application No. 201721206334.X, filed on Sep. 19, 2017, the entire contents of which are incorporated herein by reference.

TECHNICAL FIELD

The present disclosure generally relates to an air purification field, particularly to an air purifier.

BACKGROUND

At present, a wet dust-removal technology using water to remove fine particles from an atmosphere can effectively remove particles of 0.1-20 μm. However, when the air passes through the vapor mist, due to protection of bubbles, an area where the water contacts the particles is smaller, and thus an efficiency of the water vapor removing PM2.5 will be reduced. In addition, since there are hydrophilic dust and hydrophobic dust existed in the dust, a simple filtration of removing the dust by use of water mist will cause penetration of the hydrophobic dust, which cannot clean various dust efficiently.

SUMMARY

In view of foresaid defects or shortcomings in the prior art, it is expected to provide an air purifier which removes various dusts efficiently.

According to one aspect of the present disclosure, an air purifier is provided, comprising a box body and a filter screen inside the box body, an air suction device, a water mist generator, the water mist generator being disposed at one side of the filter screen, the air suction device being configured to inhale outdoor air into an interior of the box body, and the water mist generator being configured to form an ionized water layer.

According to one embodiment, the box body comprises a first panel and a second panel assembled with each other, and the air suction device is disposed at the second panel.

According to one embodiment, the water mist generator is disposed between the filter screen and the air suction device.

According to one embodiment, the filter screen, water mist generator and air suction device are in stacked arrangement in the box body in sequence in direction from the first panel to the second panel.

According to one embodiment, the water mist generator comprises a water channel, one or more spraying devices and an ionization generator, the one or more spraying devices are disposed on the water channel, the ionization generator is configured to ionize water mist sprayed by the spraying device, to form the ionized water layer.

According to one embodiment, a plane where the water channel is disposed is parallel to a plane where the filter screen is disposed.

According to one embodiment, each of the spraying devices is disposed on an inner side of the water channel.

According to one embodiment, the spraying device and the ionization generator are alternately disposed around the waterway.

According to one embodiment, the ionization generator is disposed on top and bottom sides of, or left and right sides of, or around the box body.

According to one embodiment, the air purifier further comprises a recovery device that recoveries water dropped from the ionized water layer after the dusts are absorbed.

According to one embodiment, the recovery device is disposed under the water mist generator.

According to one embodiment, there is provided with a water circulation device that conveys the water in the recovery device to the water channel.

According to one embodiment, the water circulation device comprises a water pump.

According to one embodiment, the air purifier further comprises a dust filter device that separates the water from the dust of substance(s) recovered by the recovery device.

According to one embodiment, the dust filter device comprises a filter sponge.

According to one embodiment, the water channel is a closed structure.

According to one embodiment, the filter screen is a multi-layer filter screen.

According to one embodiment, the filter screen comprises a HEPA filter screen and an activated carbon filter screen.

According to one embodiment, the HEPA filter screen is disposed at side of the activated carbon filter screen adjacent to the first panel.

According to one embodiment, an air particle detection sensor is at least disposed at a side of the water mist generator adjacent to the first panel, and the air particle detection sensor is coupled to the ionization generator.

BRIEF DESCRIPTION OF THE DRAWINGS

The other features, aspects and advantages of the present disclosure will become more apparent from the following detailed description of the embodiments not for limitation when taken in conjunction with the accompanying drawings.

DETAILED DESCRIPTION

Figure 1:
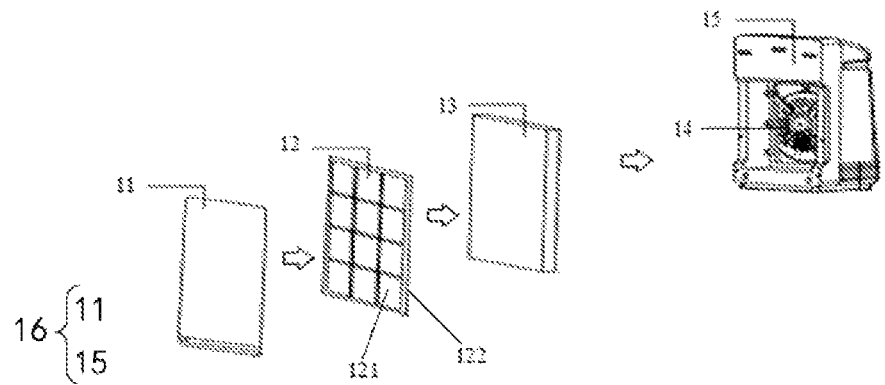
FIG. 1 shows a perspective exploded view of the air purifier according to one embodiment of the present disclosure.

Hereinafter, the present disclosure is further interpreted in combination with the drawings and the embodiments. It should be appreciated that the specific embodiments as described herein are merely employed to explain the relevant disclosure, rather to limit the disclosure. In addition, it should also be noted that only the portions relating to the present disclosure are shown in the drawings in order to description.

It should be noted that the embodiments in the present disclosure and the features in the embodiments can be combined with each other without any conflict. The present disclosure will be described in detail below with reference to the accompanying drawings and in combination with the embodiments.

Figure 2:
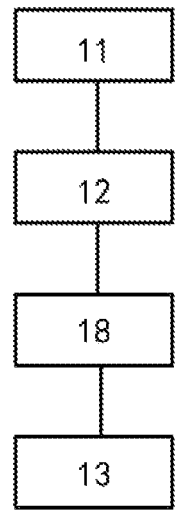
FIG. 2 shows a structure chart of the air purifier according to one embodiment of the present disclosure.

Please refer to FIG. 1, which shows an exploded schematic view of an air purifier according to an embodiment of the present disclosure and FIG. 2, which shows a structure chart of the air purifier according to one embodiment of the present disclosure.

As shown in FIGS. 1 and 2, there is provided an air purifier, including a box body 16, a filter screen 12 inside the box body 16, an air suction device 14, and a water mist generator 13. The water mist generator 13 is disposed at one side of the filter screen 12. The air suction device 14 can inhale outdoor air into an interior of the box body 16. The water mist generator 13 can form an ionized water layer.

Specifically, the box body 16 as shown in FIG. 1 is a split-type box body, including a first panel 11 at front and a second panel 15 at rear. FIG. 1 only shows an implementation of the box body. In a practical application, the box body with other structures may be employed.

The filter screen 12 may be a multi-layer filter screen. For example, the filter screen 12 may include a HEPA (High efficiency particulate air filter) filter screen 121 and an activated carbon filter screen 122. The HEPA filter screen 121 may implement HEPA standard filtration.

In this embodiment, the air suction device 14 is disposed at the second panel 15.

In this embodiment, the water mist generator 13 is disposed between the filter screen 12 and the air suction device 14. As shown in FIG. 1, the water mist generator 13 is disposed at rear of the filter screen 12, and the air suction device 14 is disposed at rear of the water mist generator 13. The filter screen 12, water mist generator 13 and air suction device 14 are in stacked arrangement in the box body in sequence in direction from the first panel 11 to the second panel 15.

In other embodiments, the water mist generator 13 may be optionally disposed at front of the filter screen 12.

It should be noted that the term of "front" and "rear" are provided according to a sequence by which the air enters, a device at front is a device through which the air passes firstly, and a device at rear is a device through which the air passes subsequently. Arrows as shown in FIG. 1 indicate flow directions of the air. Thus, the filter screen 12 is disposed at front of the water mist generator 13, and the water mist generator 13 is disposed at rear of the filter screen 12, as viewed from the flow direction of the air. That is, the air inhaled by the air suction device 14 is filtered via the filter screen 12, and then passes through the water mist generator 13.

Herein, the air purifier has a work process as follows: the air suction device 14 inhales the outdoor air into the interior of the air purifier, the inhaled air passes through the HEPA filter screen 121 firstly, in which most of dust particles, such as 0.1 micron to 0.3 micron particles in the air are adsorbed by the HEPA filter screen 121 that is characterized by allowing passage of air but prohibiting passage of fine particles; and subsequently, the air passes through the activated carbon filter screen 122 that removes odor and adsorbs harmful substances, but there is dust of less than 0.1 micron passed through the activated carbon filter screen; the remaining fine dust will be adsorbed, when the air passes through the ionized water layer formed by the water mist generator 13, in which the ionized water layer contains water mist and also negative ions, and thereby the ionized water layer may adsorb hydrophilic dust and also hydrophobic dust. It should be noted that the negative ions herein refer to the OH⁻ generated after ionization of water molecules. Two water molecules when ionized will produce one $H_3O^+$ and one $OH^-$, and specifically, an ionization equation is presented as follows:

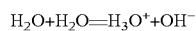

Wherein, the negative ion OH⁻ has a performance of adsorbing the dust.

Figure 3:
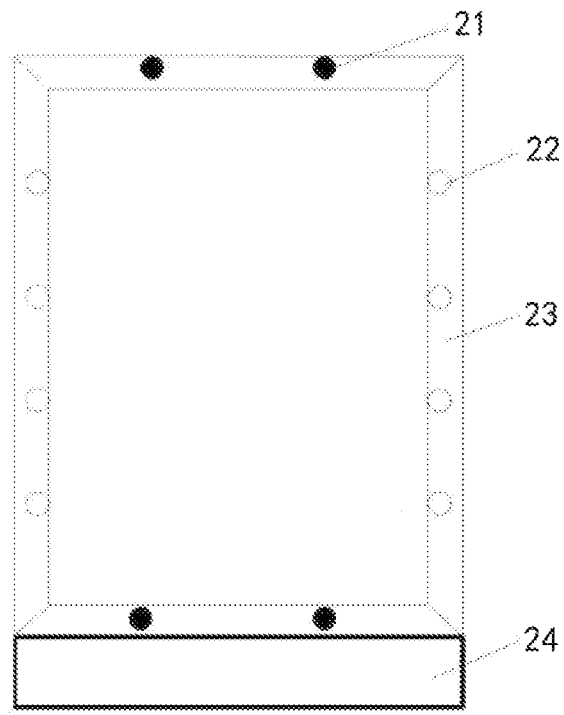
FIG. 3 shows a schematic view of the water mist generator according to one embodiment of the present disclosure.
Figure 4:
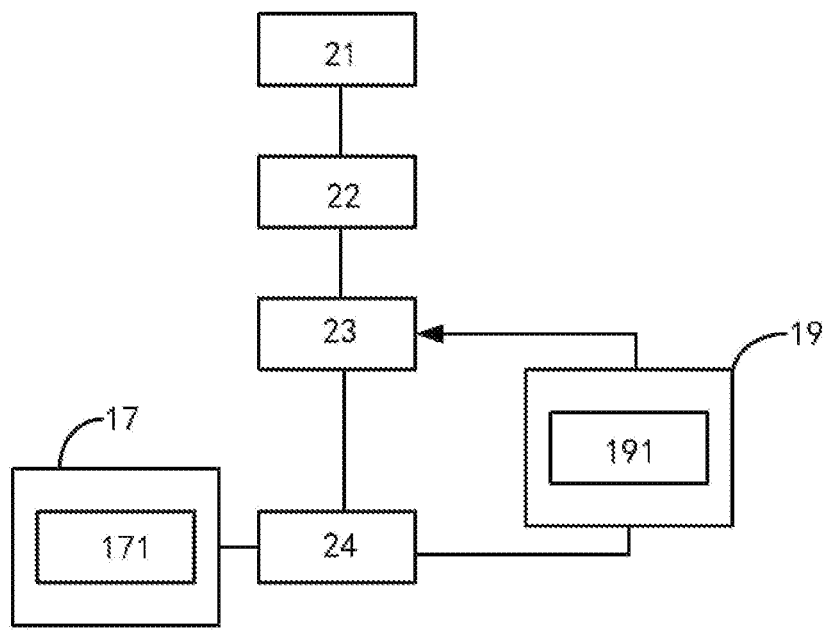
FIG. 4 shows a structure chart of the water mist generator according to one embodiment of the present disclosure.

FIG. 3 shows a structural schematic view of a water mist generator according to an embodiment of the present disclosure. FIG. 4 shows a structure chart of the water mist generator according to one embodiment of the present disclosure. As shown in FIGS. 3 and 4, the water mist generator 13 includes a water channel 23, a spraying device 22 and an ionization generator 21. The water channel 23 is provided with one or more spraying devices 22. The spraying device 22 is used to spray the water out of the water channel 23. The ionization generator 21 ionizes the water mist sprayed by the spraying device 22, to form an ionized water layer.

In this embodiment, the water mist generator 13 is disposed at rear of the filter screen 12 to improve an effect of the ionized water layer absorbing fine particles.

The water channel 23 may be a closed structure or an opened structure. The structure of the water channel, for example, a rectangular closed structure as shown in FIG. 3, or an "U" type opened structure with an opening that face randomly may be designed according to the actual situations. The spraying device 22 may employ a water spray nozzle or other devices that may generate water mist. The spraying device 22 may be disposed at any location of the water channel 23 to form a uniform water mist inside the water channel. FIG. 3 shows a distribution of the spraying device 22 in a rectangular water channel 23. The spraying device 22 in FIG. 3 is evenly distributed on left and right sides of the rectangular water channel 23, of course, the spraying device 22 may also be evenly distributed on top and bottom sides of the rectangular water channel 23, or evenly distributed around the rectangular water channel 23. It could be understood that a pressurizing device may be provided in the water channel 23 to increase water pressure in the water channel, and thus a better spraying effect can be achieved.

In an embodiment, a plane where the water channel 23 is disposed is parallel to a plane where the filter screen is disposed, such that the air contacts with the ionized water layer sufficiently while passing through the ionized water layer, to improve purification efficiency.

In some embodiments, spraying devices 22 are disposed on an inner side of the water channel 23. The spraying devices 22 may be evenly disposed on the inner side of the water channel 23 in order to form uniform water mist in the interior of the water channel 23.

In some embodiments, the ionization generator 21 is disposed only on the top and bottom sides of the box body 16, or only on the left and right sides of the box body 16, or around the box body 16. Specifically, the ionization generator 21 may be disposed on the box body at the periphery of the water channel 21 and used in cooperation with the spraying device 22, so that an ionization field formed by the ionization generator 21 can cover the water mist formed by the spraying device 22, and thereby a highly-efficient ionization can be achieved.

As shown in FIGS. 3 and 4, the spraying device 22 is disposed on the inner sides of the left and right sides of the water channel 23, and the ionization generator 21 is disposed on the top and bottom sides of the box body. In this case, the water mist sprayed by the spraying devices 22 on the left and right sides is distributed in the interior of the water channel 23, and the ionization field formed by the ionization generators 21 on the top and bottom sides covers the interior of the water channel 23, such that the water mist is ionized efficiently. In other embodiments, the spraying devices 22 may be disposed on the inner sides of the top and bottom sides of the water channel 23, and the ionization generator 21 may be disposed on the left and right sides of the box body. Alternatively, the spraying device 22 and the ionization generator 21 are alternately disposed around the water channel 23 according to a certain proportion, which will not be described any more.

In an embodiment, the air purifier further includes a recovery device 24 that recovers water dropped from the ionized water layer after the dust is absorbed. Specifically, the negative ions in the mist adsorb the suspended dust and drip down, when the air carried with the fine dust passes through the ionized water layer. In this case, the recovery device 24 is disposed under the water channel to recover these droplets absorbing dust.

In order to recycle the recovered water, a water circulation device 19 may be provided to convey the water in the recovery device 24 to the water channel 23. The water circulation device 19 may include a water pump 191 through which the recovered water can be conveyed to the water channel 23, and which increases the water pressure in the water channel 23.

In addition, a dust filter device 17 may also be provided inside the recovery device 24, and separate the water from the dust of substances recovered by the recovery device, such that clean water flows into the water channel 23 through the water circulation device 19. The dust filter device 17 may be made of a filter sponge 171 or other dust filter devices that are able to separate the water from the fine dust.

In addition, in order to realize smart control of a density of the negative ions in the ionized water layer according to a density of the dust in the air, at front of the water mist generator is at least provided an air particle detection sensor 18 coupled to the ionization generator, for example, in communication connection with the ionization generator. Strength of the ionization field may be reduced when the ionization generator receives a signal of the dust having a smaller density. Alternatively, the air particle detection sensor 18 is in communication connection with the water pump to reduce the density of the water mist by decreasing the water pressure. Alternatively, the air particle detection sensor 18 is connected to the spraying device to reduce the density of the water mist by controlling the spraying device. The spraying device is a spraying device that may control spraying strength. The several controlling methods as above mentioned may also be used in combination, for example, by receiving particle information sent by the air particle detection sensor 18 via a control unit, such as a processor or an MCU, and controlling the ionization field intensity of the ionization generator, and by controlling the ionization field strength of the ionization generator, and by controlling water mist density of the spraying device and the water pump, the density of the negative ions of the ionized water layer can be adjusted. Such control unit is electrically connected to the ionization generator, the spraying device and the water pump.

As known from the above technical solutions, the air purifier as provided by the present disclosure has advantages and positive effects: the technical solution as provided in the embodiment of the present disclosure can solve a problem of difficultly removing various fine particles from the wet-type air purifier, in particular difficultly removing hydrophobic dusts.

The foregoing description is only a preferred embodiment of the present disclosure and an explanation for principles of the employed technology. It should be understood by those skilled in the art that the scope involved in the present disclosure is not limited to the technical solutions combined by the above technical features, but also should cover other technical solutions formed by the aforesaid technical features or any combination of the equivalent technical features thereof without departing from the inventive concept, for example, the technical solution formed by mutual substitution of the above-described features for the technical features with similar function as disclosed but not limited to the present disclosure.

What is claimed is:

1. An air purifier, comprising:
a box body,
a filter screen, disposed inside the box body, and
an air suction device, a water mist generator, the water mist generator is disposed at one side of the filter screen, the air suction device being configured to inhale outdoor air into an interior of the box body, and the water mist generator being configured to form an ionized water layer;
the water mist generator comprising a water channel, one or more spraying devices and an ionization generator, the one or more spraying devices are disposed on the water channel, the ionization generator is configured to ionize water mist sprayed by the one or more spraying devices, to form the ionized water layer.

2. The air purifier according to claim 1, wherein the box body comprises a first panel and a second panel assembled with each other, and the air suction device is disposed at the second panel.

3. The air purifier according to claim 2, wherein the water mist generator is disposed between the filter screen and the air suction device.

4. The air purifier according to claim 3, wherein the filter screen, water mist generator and air suction device are in stacked arrangement inside the box body in sequence in a direction from the first panel to the second panel.

5. The air purifier according to claim 1, wherein a plane where the water channel is disposed is parallel to a plane where the filter screen is disposed.

6. The air purifier according to claim 3, wherein each of the spraying devices is disposed on an inner side of the water channel.

7. The air purifier according to claim 6, wherein the spraying device and the ionization generator are alternately disposed around the water channel.

8. The air purifier according to claim 6, wherein the ionization generator is disposed on top and bottom sides of, or left and right sides of, or around the box body.

9. The air purifier according to claim 1, further comprising a recovery device recovering water dropped from the ionized water layer after dust is absorbed.

10. The air purifier according to claim 9, wherein the recovery device is disposed under the water mist generator.

11. The air purifier according to claim 9, wherein there is provided with a water circulation device that conveys water in the recovery device to the water channel.

12. The air purifier according to claim 11, wherein the water circulation device comprises a water pump.

13. The air purifier according to claim 9, further comprising a dust filter device separating water from dust of substance(s) recovered by the recovery device.

14. The air purifier according to claim 13, wherein the dust filter device comprises a filter sponge.

15. The air purifier according to claim 1, wherein the water channel is a closed structure.

16. The air purifier according to claim 11, wherein the filter screen is a multi-layer filter screen.

17. The air purifier according to claim 16, wherein the filter screen comprises a HEPA filter screen and an activated carbon filter screen.

18. The air purifier according to claim 17, wherein the HEPA filter screen is disposed at a side of the activated carbon filter screen adjacent to a first panel.

19. The air purifier according to claim 1, wherein an air particle detection sensor is disposed at a side of the water mist generator adjacent to a first panel, and the air particle detection sensor is coupled to the ionization generator.

* * * * *